United States Patent
Daoud et al.

(10) Patent No.: US 6,580,866 B2
(45) Date of Patent: Jun. 17, 2003

(54) FIBER SPLICE HOLDER WITH PROTECTED SLACK STORAGE FEATURE

(75) Inventors: Bassel H. Daoud, Parsippany, NJ (US); David S. Kerr, Morris Plains, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/858,928

(22) Filed: May 16, 2001

(65) Prior Publication Data

US 2002/0172489 A1 Nov. 21, 2002

(51) Int. Cl.[7] ................................................. G02B 6/00
(52) U.S. Cl. ........................ 385/135; 385/134; 385/137
(58) Field of Search .............................. 385/134, 135, 385/137; 379/438

(56) References Cited

U.S. PATENT DOCUMENTS

| | | | | |
|---|---|---|---|---|
| 4,792,203 A | * | 12/1988 | Nelson et al. | ............... 385/134 |
| 5,115,489 A | * | 5/1992 | Norris | ......................... 385/135 |
| 5,339,379 A | * | 8/1994 | Kutsch et al. | ............... 385/135 |
| 5,515,472 A | | 5/1996 | Mullaney et al. | |
| 5,590,234 A | | 12/1996 | Pulido | |
| 5,835,657 A | | 11/1998 | Suarez et al. | |
| 6,424,783 B1 | * | 7/2002 | Hara | ......................... 385/135 |

FOREIGN PATENT DOCUMENTS

GB        2290777 A    *    1/1996      ............ H04M/1/15

* cited by examiner

Primary Examiner—Hemang Sanghavi
Assistant Examiner—Eric Wong

(57) ABSTRACT

A fiber optic splice holder with a slack storage feature has a reel having a hub for fiber slack storage, and a means for holding a splice at its center, whereby fiber slack can be stored and retrieved while protecting the fiber splice, in a manner which avoids entanglement with other splices and fibers. The reel is supported by a reel holder, which can be reversibly mounted in a modular rack for easy storage, and permits easy access to individual splices and accompanying slack.

11 Claims, 3 Drawing Sheets

FIBER SPLICE HOLDER WITH PROTECTED SLACK STORAGE FEATURE

BACKGROUND OF THE INVENTION

1. Field of the Invention

This invention relates to an apparatus for protecting and providing slack storage to optical fibers having a splice portion therein.

2. Description of Related Art

In optical communication systems it is frequently necessary to join or "splice" the ends of two fiber optic cables to allow for the addition of branch lines, or for repairs and adjustments. Because fiber optic cable is small and fragile, these splices are typically held in protective enclosures, many varieties of which have been described in the prior art. U.S. Pat. Nos. 5,515,472, 5,590,234 and 5,835,657, for example, describe such devices. In designing such enclosures, a variety of issues which stem from the nature of fiber optic cable must be addressed. For example, in order to avoid signal degradation, fiber within the enclosure must be held in a manner which ensures that the minimum bend radius of the glass fiber is not exceeded. In addition, enclosures frequently must provide strain relief against cable stresses caused by external cable movement relative to the enclosure.

For multi-fiber cables, a plurality of fiber splices may be held in a single enclosure, and care must be taken to avoid entanglement of fibers. Enclosures housing a plurality of splices typically do not allow easy access to individual fiber splices within the enclosure. Finally, because splices require additional cable, it is common to keep an excess of fiber slack in a separate storage device adjacent to a splice to facilitate future repairs. The need to store fiber slack further complicates the problems of fiber entanglement and access to individual splices.

For the forgoing reasons, there is a continuing need for an apparatus which can hold both a splice and some fiber slack in a manner which protects them from entanglement with other splices and fibers. There is a further need for an apparatus which allows for easy access to selected splices and associated fiber slack to make repairs, etc., while all other splices and associated fiber slack remain protected within their own compartments.

BRIEF SUMMARY OF THE INVENTION

Briefly described, the invention is directed to an apparatus for protecting and providing slack to optical fibers having a splice portion therein comprising a reel having both fiber slack storage means and fiber splice holder means, and a reel holder. The reel holder supports the reel such that it is freely rotatable about its center, thereby allowing for easy storage and retrieval of fiber slack from the reel while protecting the splice, and in a manner which avoids entanglement with other splices and fibers. The holder preferably has a mounting means so that the apparatus can be removably mounted in a modular rack, allowing for easy storage, and permitting easy access to individual splices and associated slack.

The invention may be more fully understood by reference to the following drawings.

DETAILED DESCRIPTION OF THE INVENTION

During the course of this description like numbers will be used to identify like elements according to the different figures which illustrate the invention.

Figure 1:
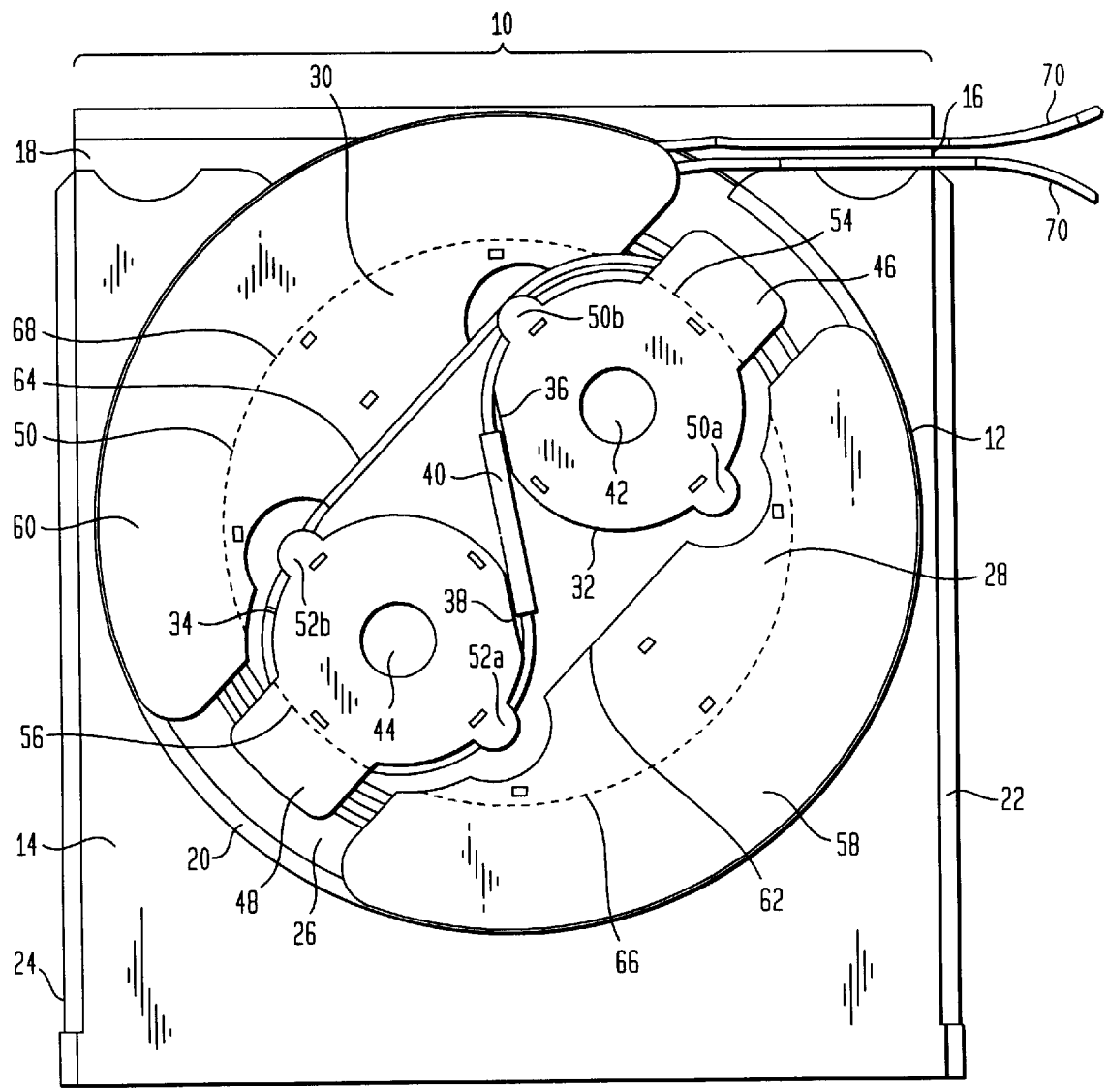
FIG. 1 shows a preferred embodiment of the present invention.

FIG. 1 shows a preferred embodiment 10 of the present invention, which comprises a reel 12 for protecting a fiber optic splice and storing fiber, and a reel holder 14. Reel holder 14 has a first fiber receiving channel 16, a second fiber receiving channel 18, a circular cut-out having a rim 20 for holding the reel 12, and a first and second side rail 22 and 24, respectively, for mounting preferred embodiment 10 in a modular storage device.

Reel 12 has a base 26, a first and second cap 28 and 30, respectively, and a first and second spool 32 and 34, respectively. First and second spools 32 and 34 have flat edges 36 and 38, respectively, which are aligned parallel to each other to form a channel which fixes fiber splice holder 40 in place. First and second spools 32 and 34 have finger grooves 42 and 44, respectively, as well as fiber retaining tabs 46 and 48, respectively. In addition spools 32 and 34 have ears 50a,b and 52a,b, respectively. Spool sides 54 and 56 directly below fiber retaining tabs 46 and 48, respectively, form part of a discontinuous circular hub of reel 12, around which fiber slack is wound.

Caps 28 and 30 have fiber shields 58 and 60, respectively, for protecting stored fiber slack, and flat edges 62 and 64. Caps 28 and 30 have outer arc-shaped sides 66 and 68, directly under fiber shields 58 and 60, respectively, which also form part of the discontinuous circular hub of rim 12, around which fiber slack is wound.

A loop of optical fiber 70 enters the apparatus through fiber accepting channel 16. Initially the loop is wound under fiber retaining tab 48 and ears 52a and 52b on second spool 34, with the fiber splice holder 40 secured in place by the channel formed by the flat edges 36 and 38 of the first and spools 32 and 34, respectively. The radius of second spool 34 must be such, i.e., at least 1½ inches, that the minimum bend radius of the glass fiber loop is not exceeded. Both ends of the resulting loop are then wound under ear 50b on the first spool 32 as illustrated in FIG. 1, with one fiber aligned parallel to the flat side of second cap 30. The reel is then rotated in counterclockwise fashion by means of the finger grooves 42 and 44 to store fiber slack around the reel hub comprised of 54, 56, 66, and 68.

Alternatively, a loop of optical fiber 70 can enter the apparatus through fiber accepting channel 18. Initially it is wound under fiber retaining tab 54 and ears 50a and 50b on first spool 32, with the fiber splice holder 40 secured in place, place by the channel formed by the flat edges 36 and 38 of the first and spools 32 and 34, respectively. Both ends of the resulting loop are then wound under ear 52b on second spool 34, with one strand parallel to the flat side of second cap 64. The reel is then rotated in a clockwise fashion by means of the finger grooves 42 and 44 to store fiber slack around the reel hub comprised of 54, 56, 66, and 68.

Figure 2:
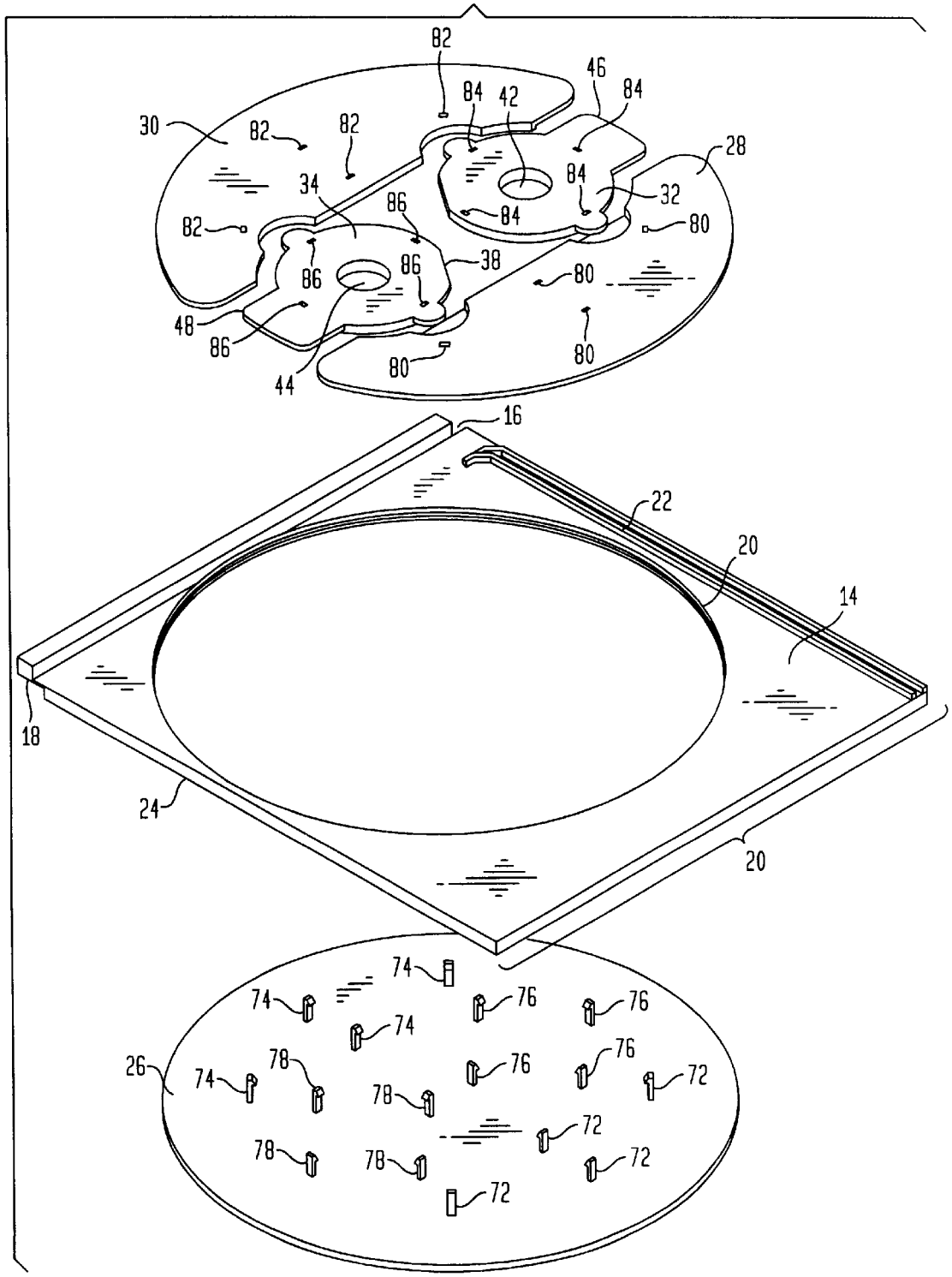
FIG. 2 shows an exploded view of the preferred embodiment of FIG. 1.

FIG. 2 shows an exploded view of the preferred embodiment of FIG. 1. Reel base 26 has flexible vertical tabs 72 and 74 for attaching caps 28 and 30 via cut outs 80 and 82, respectively in the caps. Reel base 26 also has flexible vertical tabs 76 and 78 for attaching spools 32 and 34 via cut outs 84 and 86, respectively in the spools. Rim 20 on reel holder 14 has a thickness sufficient to fit snugly between reel base 26 and fiber shields 58 and 60, but in a manner which allows for rotation of the reel about its axis, when reel base 26 and caps 28 and 30 are attached by snapping flexible vertical tabs 72 and 74 into cut-outs 80 and 82.

Figure 3:
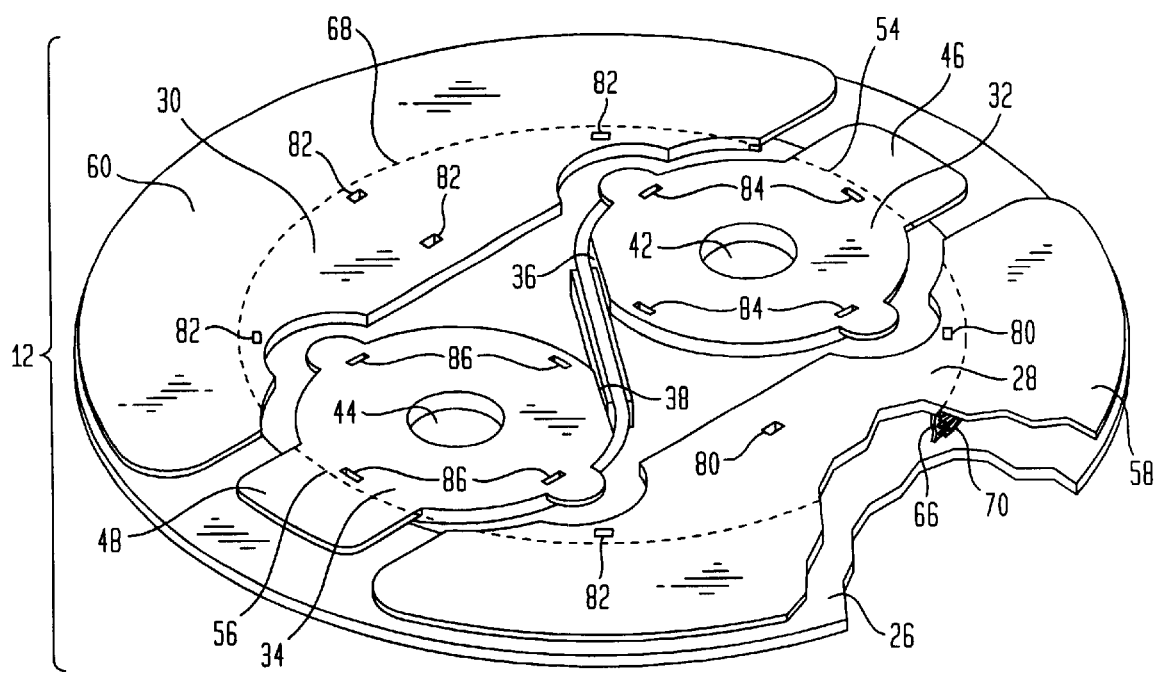
FIG. 3 shows a cut-away view of the reel of the preferred embodiment of FIG. 1.

FIG. 3 shows a cut-out view of the reel 12 of the embodiment of FIG. 1, more clearly illustrating how vertical side 66 of first cap 28 forms a portion of the discontinuous reel hub comprised of 54, 56, 66 and 68, around which fiber is wound.

Figure 4:
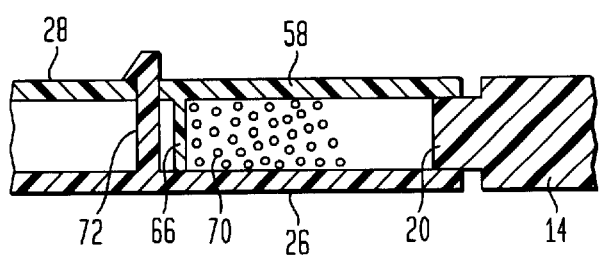
FIG. 4 shows an end-on view of the preferred embodiment of FIG. 1.

FIG. 4 shows the manner in which vertical pins 72 on base 26 interlock with first cap 28. Also illustrated is the manner in which the reel holder rim 20 which fits snugly between the reel base 26 and the fiber shield 58 of first cap 28 to support reel 12.

While the invention has been described with reference to a preferred embodiment thereof, it will be appreciated by those of ordinary skill in the art that modifications can be made to the structure and elements of the invention without departing from the spirit and scope of the invention as a whole.

What is claimed is:

1. An apparatus for protecting and providing slack to optical fibers having a splice portion therein comprising:

a reel comprising a fiber slack storage means;

a fiber splice holder means;

a reel base;

a first and second cap, co-linear with and on opposite sides of the center of said reel, each of said caps having an arc-shaped exterior wall;

a first and second spool, co-linear with and on opposite sides of the center of said reel each located between said first and said second caps, each of said spools having an arc shaped exterior wall;

wherein said first and said second cap and said first and said second spool are secured to said reel base in a fixed stationary position relative to said reel base and wherein said first and said second cap exterior walls and said first and second spool exterior walls form a discontinuous circular hub around which fiber is wound while retaining said caps and said spools secured to said reel base; and, said apparatus further comprising a reel holder having reel accepting means for supporting said reel in said reel holder such that said reel is freely rotateable about its center, wherein said fiber slack can be stored and retrieved from said fiber storage means while protecting said splice portion therein.

2. The apparatus of claim 1 wherein said reel holder has a circular cut out having a rim for attaching said reel.

3. The apparatus of claim 1 wherein said reel holder has fiber accepting means.

4. The apparatus of claim 1 wherein said first and said second caps further comprise fiber shields for protecting fiber wound around said hub.

5. The apparatus of claim 1 wherein each of said spools has a flat side, said flat sides being arranged in parallel fashion so as to form said fiber splice holder means at the center of said reel.

6. The apparatus of claim 5 wherein said first and said second spools further comprise fiber retaining tabs for retaining fiber wound around said hub.

7. The apparatus of claim 6 wherein said first and said second spools further comprise means for turning said reel about its axis in said reel holder.

8. The apparatus of claim 7 wherein said means for turning said reel comprise depressions in the center of each of said spools for use as finger holes.

9. The apparatus of claim 8 wherein the radius of said first and said second spools is at least 1½ inches.

10. The apparatus of claim 1 wherein said base is detachable from said first and second caps and said first and second spools.

11. The apparatus of claim 1 wherein said reel holder further comprises mounting means for mounting said apparatus in a modular rack.

* * * * *